Oct. 27, 1964 HIROSHI KITAGAWA ETAL 3,154,435
ALKALINE DRY CELL
Filed April 24, 1961
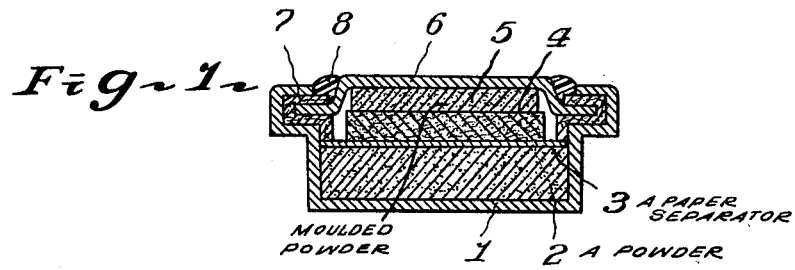
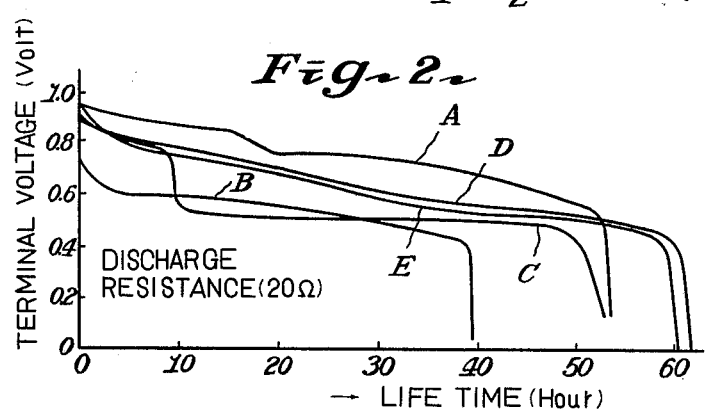
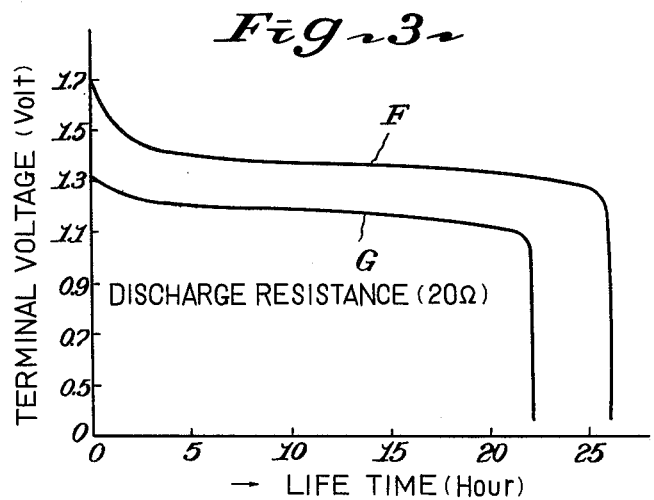

3,154,435
ALKALINE DRY CELL

Hiroshi Kitagawa, Kitatama-gun, Tokyo-to, Minoru Yonago, Suginami-ku, Tokyo-to, and Masaru Fujita, Minamitama-gun, Tokyo-to, Japan, assignors to Kabushiki Kaisha Hitachi Seisakusho, Tokyo-to, Japan, a joint-stock company of Japan
Filed Apr. 24, 1961, Ser. No. 105,200
Claims priority, application Japan, July 19, 1960, 35/31,550
3 Claims. (Cl. 136—137)

This invention relates to dry electro-chemical cells, and more particularly it relates to a new and improved, alkaline dry cell of the enclosed, encapsulated construction.

The electric power discharging life of the manganese dry cells known and generally used heretobefore has been short, and their voltages have varied gradually with the elapse of time until the cells have entered a state wherein they could not withstand further use. Moreover, the percentage of utilization of these cells from the point of view of their theoretical capacities have been merely of the order of 30 percent. Accordingly, the space volumes occupied by such cells have been unavoidably large.

Recently, with development of such products as transistors, the demand for miniaturization of such electronic equipment as miniature radios has increased. Accordingly, the demand for dry cells to be used as power sources for these items of equipment has also steadily called for further miniaturization and increase of energy capacity.

As power sources to meet this demand, alkaline type mercury batteries, silver oxide batteries, rechargeable nickel-cadmium batteries, and others have been invented, but in all of these types of batteries, their physical volumes have regrettably been large for their electrical capacities.

It is an essential object of this invention to eliminate the above-mentioned disadvantages heretofore accompanying alkaline dry cells and to provide a new and improved, alkaline dry cell of small size yet high electrical energy storage capacity.

It is another object of this invention to provide an alkaline dry cell as specified above which is, furthermore, simple, easily fabricated, and strong, enclosed construction suitable for mass production at economically feasible cost.

The development of the alkaline dry cell of the present invention has resulted from extensive research by the inventors on various depolarizers with the foregoing objects in view. As one significant result, it was found that a dry cell utilizing as a depolarizer a mixture of cupric oxide, bismuth oxide, and bismuth oxychloride has a longer life than any of the known dry cells mentioned above, and that, through the utilization of this depolarizer, a dry cell of large capacity with respect to the same weight of depolarizer is obtainable.

More specifically, the afore-stated objects of the invention are achieved by the dry cell of the present invention which, in general, is of enclosed or encapsulated construction, and in which a depolarizer composed of 0.5 to 20% of bismuth oxide, 0.5 to 20% bismuth oxychloride, and a remainder of cupric oxide is used.

It should be mentioned here that dry cells having as a depolarizer either cupric oxide, bismuth oxide, or bismuth oxychloride have been proposed heretofore, but since in all these cases, the closed-circuit voltages have been low, the said cells have showed no promise as dry cells.

While the dry cell of the present invention belongs in this classification of such dry cells, it has been successfully made to have a prolonged life by the selection of its depolarizer as described above. Moreover, by connecting two or three cells in series thereby causing the cell to have a closed-circut voltage which is substantially equal to that of an equivalent, conventional dry cell, the disadvantage of low closed-circuit voltage of this type of dry cell can be compensated for, and the dry cell can be made to have ample practicability.

The details of the invention will be more clearly apparent by reference to the following description of one embodiment of the invention when taken in connection with the accompanying drawings, in which:

FIG. 1 is an elevational view, in section, showing the embodiment of the invention;

FIG. 2 is a graphical representation for a comparison of the discharge characteristic of the dry cell of the present invention and that of dry storage cells wherein cupric oxide, bismuth oxide, and bismuth oxychloride are respectively use as depolarizers; and FIG. 3 is a graphical representation for a comparison of the discharge characteristic of the dry cell of the invention and that of a mercury dry cell.

Referring to FIG. 1, into the bottom of a metal can 1 (cathode) of such a material as steel which has been coated by some method such as nickel plating, a depolarizer 2 is pressed. The upper surface of this depolarizer 2 is covered with a partition diaphragm 3 of such a material as parchment paper, and on this diaphragm 3, an electrolyte absorber 4, consisting of previously alkali-treated absorbent cotton which has been impregnated with a 40% potassium hydroxide solution saturated with zinc oxide, is disposed centrally. Then an anode 5, consisting of compression-moulded zinc powder which has been mercurized 10% and is of 45- to 80-mesh grain size, is positioned centrally on the said absorber 4. On top of his anode 5, a sealing lid 6 is placed, and the peripheral edge of this lid 6 and the open upper end of the metal can 1 are tightly sealed, by a suitable method, with an insulating packing 7 made of such a substance as polystyrene interposed therebetween. In the preferred embodiment illustrated in FIG 1, the joint between the lid 6 and the can 1 is similar to the bead type commonly used in sealing the lid or cap of can containers, the upper end of the can 1 being formed to clamp on the opposing sides of the peripheral portion of the lid 6, over the interposed insulating packing 7, and the lid 6 being joggled to protrude above the highest portion of the can 1. To completely seal the joint so as to prevent leaking out of liquid, a sealing material 8 consisting of an alkali-resistant, high-polymer substance which has adhesive property with respect to metals is charged into the space between the can 1 and the lid 6 at the outer portion of their juncture.

The above-mentioned depolarizer is a mixture composed of 0.5 to 20 percent of bismuth oxide 0.5 to 20 percent of bismuth oxychloride, and a remainder of cupric oxide.

The advantageous characteristics of the dry cell according to the present invention will be readily apparent from the following comparisons of the said characteristics with those of convention dry cells of similar type, when taken in conjunction with FIGS. 2 and 3.

In FIG. 2, all of the curves shown are 20-ohm discharge characteristic curves as represented on coordinates of terminal voltage versus cell life. Curves A, B, and C are those of conventional dry cells which have depolarizers composed of cupric oxide, bismuth oxide, and bismuth oxychloride, respectively. Curve D is that of a dry storage cell according to the present invention wherein the depolarizer is composed of a mixture of 5% of bismuth oxide, 20% of bismuth oxychloride, and 75% of cupric oxide. Curve E is that of a dry cell according to the present invention wherein the depolarizer is composer of a mixture of 10% of bismuth oxide, 15% of bismuth oxychloride, and 75% of cupric oxide.

As is evident in FIG. 2, the dry cell of the present invention, in comparison with the conventional dry cells whose characteristics are shown, has almost the same voltage characteristic but has a substantially longer life.

The curves F and G shown in FIG. 3 are, respectively, those of two dry cells according to the present invention placed in laminate arrangement (series connection) and of a conventional mercury dry cell in which a depolarizer of the same weight as that in the case of curve F is used, both curves being 20-ohm discharge characteristic curves as represented on coordinates of terminal voltage versus cell life as in the case of FIG. 2.

As is evident, in FIG. 3, a dry cell composed of two dry cells of the present invention in laminate arrangement has a terminal voltage which is somewhat higher than that of a conventional mercury dry cell and a cell life which is approximately 20% longer than that of the said mercury dry cell.

As is apparent from the foregoing description, the dry cell of the present invention has the advantages, over conventional dry cells, of longer life and of a greater electric energy capacity for the same weight of depolarizer.

Although this invention has been described with respect to a particular embodiment thereof, it is not to be so limited as changes and modifications may be made therein which are within the full intended scope of the invention, as defined by the appended claims.

What is claimed is:

1. A depolarizer for an alkaline primary cell comprising a mixture of approximately 0.5 to 20 percent by weight of bismuth oxide, approximately 0.5 to 20 percent by weight of bismuth oxychloride, and the remainder being cupric oxide.

2. An alkaline primary cell comprising a metal anode, a depolarizer, a permeable spacer separating said anode from said depolarizer, and an alkaline electrolyte permeating said anode, spacer and depolarizer, the constituents of said depolarizer at the time that the cell is put into service consisting of a mixture of approximately 0.5 to 20 percent by weight of bismuth oxide, approximately 0.5 to 20 percent of bismuth oxychloride, and the remainder being cupric oxide.

3. An alkaline primary cell according to claim 2 wherein the anode consists essentially of an amalgamated zinc.

References Cited in the file of this patent

UNITED STATES PATENTS

| | | |
|---|---|---|
| 1,195,677 | Heil | Aug. 22, 1916 |
| 2,859,267 | Garvey et al. | Nov. 4, 1958 |

FOREIGN PATENTS

| | | |
|---|---|---|
| 5,922 | Great Britain | of 1884 |